Feb. 23, 1954
J. O. GILL
2,670,164
SHOCK ABSORBER
Filed Nov. 29, 1949
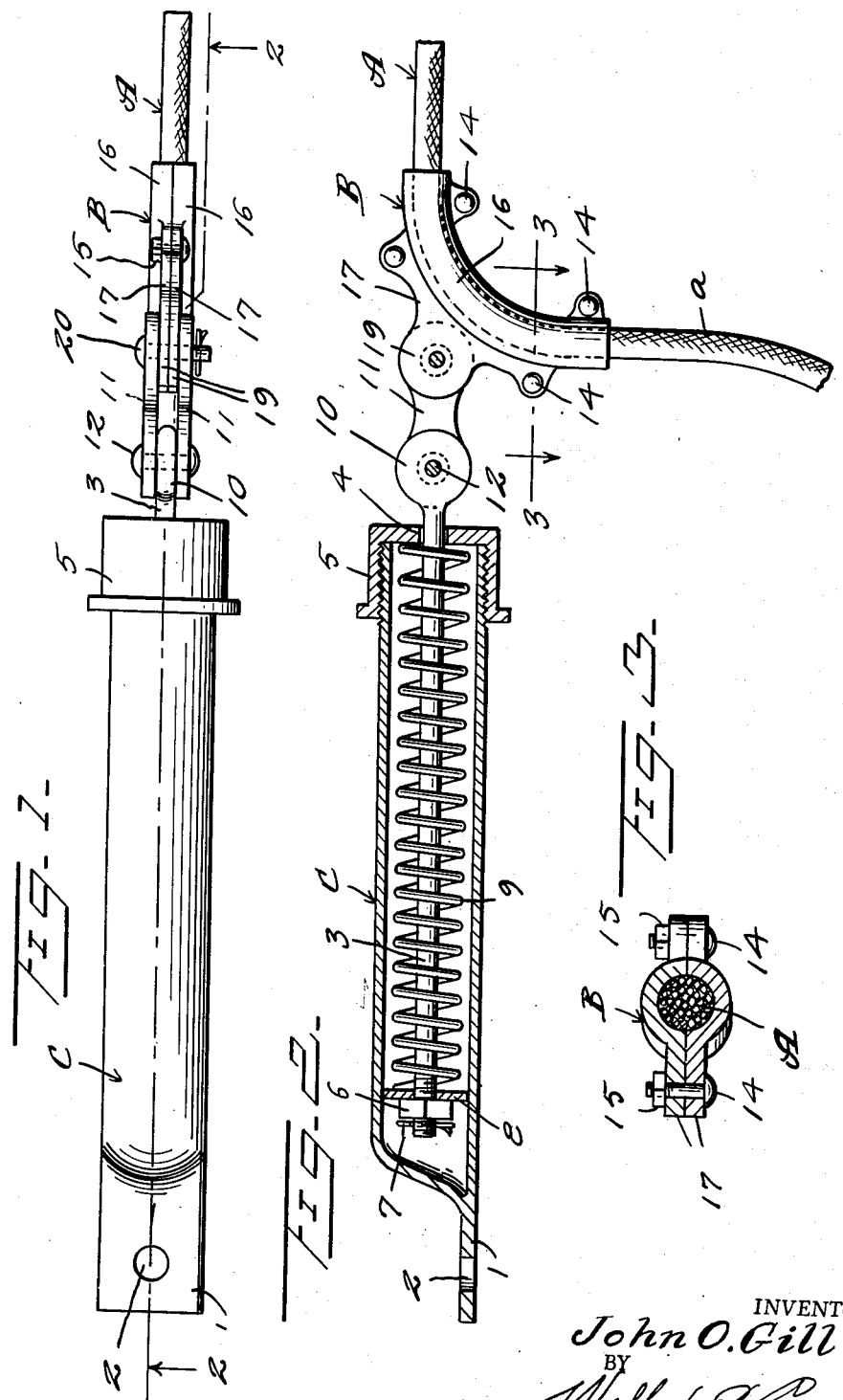
INVENTOR.
John O. Gill
BY
Wilfred E. Lawson
Atty.

Patented Feb. 23, 1954

2,670,164

UNITED STATES PATENT OFFICE 2,670,164

SHOCK ABSORBER

John O. Gill, Barnesboro, Pa.

Application November 29, 1949, Serial No. 130,008

1 Claim. (Cl. 248—63)

This invention relates to shock absorbers and has relation more particularly to a device of this kind to be used on trailing power cables in coal mines and it is an object of the invention to provide a device of this kind to relieve the strain on the cables when pulled tightly by car, machine, locomotive and the like.

Furthermore it is an object to provide a strong snubber to hold a cable without breaking the cable through the medium of a spring to absorb shock and to ease the load on the cable.

The invention also has for an object to provide a device of this kind which may be effectively used as an anchor for the dead end of a cable.

The invention consists in the details of construction and in the combination and arrangement of the several parts of my improved shock absorbers whereby certain advantages are attained, as will be hereinafter more fully set forth.

In order that my invention may be better understood, I will now proceed to describe the same with reference to the accompanying drawing, wherein:

Figure 1 is a view in top plan of a shock absorber constructed in accordance with an embodiment of the invention; an associated cable being shown in fragment;

Figure 2 is a view partly in side elevation and partly in section of the device as illustrated in Figure 1, the section being taken substantially on the line 2—2 of Figure 1; and Figure 3 is a sectional view taken substantially on the line 3—3 of Figure 2.

In the embodiment of the invention as illustrated in the accompanying drawing C denotes an elongated tubular casing closed at one end and open at its opposite end. The closed end of the casing C is provided with an outstanding ear 1 provided with an opening 2 whereby means are provided for securing the casing to the roof or other part of a mine car or the like and permit the device to be used advantageously as an anchor for the dead end of a cable A.

Extending within the casing C through the open end thereof is an elongated rod or shank 3 which is also freely disposed through an opening 4 at the axial center of a cap 5 threaded upon or otherwise detachably engaged with the open end portion of the casing C. The outer end of the rod or shank 3 at all times extends outwardly beyond the cap 5 when the various parts of the device are assembled.

Threading upon the inserted end portion of the rod or shank 3 is a head or nut 6 locked on the rod or shank 3, by a cotter pin 7 inserted through the rod or shank 3 outwardly of the applied head or nut 6. Inwardly of the applied head or nut 6, the rod or shank 3 is freely surrounded by a disk or washer 8 of a diameter substantially equal to the internal diameter of the casing C and thus serve as a support for the inserted end portion of the rod or shank 3 to prevent the same from wobbling. The disk or washer 8 also serves as an abutment for the inserted end of an expansible member 9 the opposite end of which abutting the applied cap 5. As herein comprised the expansible member 9 being herein disclosed as a coil spring encircles the portion of the rod or shank 3 within the casing C. This expansible member or spring 9 serves to impose a pull or strain of the cable A operatively engaged with the outer extended portion of the rod or shank 9 and also to snub or absorb the shocks imposed upon the cable A and thus reduce to a minimum the liability of breakage of the cable.

The outer extended portion of the rod or shank 3 is provided with a flat head 10 which is disposed between corresponding end portions of the short links 11 and pivotally connected thereto as at 12.

The cable clamp comprises two substantially duplicate sections B arranged side by side and held in assembled relation by the removable bolts 14 with each of which is associated the usual holding and clamping nut 15.

Each of the sections B comprises a semi-cylindrical arcuate member 16 of substantially a quarter circle and of predetermined radius. These sections 16 receive therebetween the dead end or outer portion of the cable A and are stamped thereto by the bolts 14 and nuts 15. Certain of the bolts 14 are disposed between the opposite end portions of the flanges 17 extending along the out bow or back portions of the sections 16 and immediately along the outer bow margins of the sections other of the bolts 14 are directed through the ears 18 extending outwardly from the inbow ends of the sections 16 immediately adjacent to the free edges of the sections.

The central portions of the flanges 17 are provided with the outwardly disposed ears 19 which are received between the outer end portions of the links 11 and pivotally held thereto by the headed pin 20 which is held against displacement by the cotter pin 21 or otherwise as desired.

From the foregoing it is believed to be readily apparent that the device as herein disclosed is of particular advantage for trailing cables as used in and about coal mines. The links 11 give flexibility to the device to assure the maintenance of alignment with a shuttle car or the like and thus substantially avoiding damage to the cable.

It is also to be pointed out that by having the clamp circular, the cable is effectively protected at the bend and held from slipping. The circular or curved clamp holds the cable tight and lets the loose end $a$ curve down to the usual fuse box or switch.

I claim:

A shock absorber support for a cable, including a spring tensioned rod, a clamp formed of two substantially duplicate quarter-circular sections, each section being of semi-circular cross sectional form, apertured ears spaced along the concave side edge of each of said sections, an apertured flange formed along the convex side edge of each of said sections, said flanges and ears of the sections being in side by side relation, bolts engaged in the said apertures of said ears and flanges, each of said flanges being formed with an outwardly directed circular extension substantially midway between the ends of said sections and spaced parallel links pivotally connecting an end of said rod with the circular extensions of said flanges, said cable being clamped between said quarter circular sections and said rod being disposed in line with one run of the cable so that strain on the said one cable run is resisted by the rod tensioning spring.

JOHN O. GILL.

References Cited in the file of this patent

UNITED STATES PATENTS

| Number | Name | Date |
| --- | --- | --- |
| 1,884,036 | Malone | Oct. 25, 1932 |
| 2,149,875 | Talbott | Mar. 7, 1939 |
| 2,159,870 | Wert | May 23, 1939 |
| 2,237,597 | Fisher | Apr. 8, 1941 |
| 2,335,833 | Wood | Nov. 30, 1943 |
| 2,390,192 | St. Clair | Dec. 4, 1945 |
| 2,439,067 | Wood | Apr. 6, 1948 |